Patented Nov. 11, 1947

2,430,849

UNITED STATES PATENT OFFICE 2,430,849

TREATMENT OF CARCASSES

Beverly E. Williams, Chicago, Ill., assignor to Industrial Patents Corporation, Chicago, Ill., a corporation of Delaware No Drawing. Application September 11, 1944, Serial No. 553,673

4 Claims. (Cl. 99—107)

1

This invention relates to the treatment of animal carcasses and has to do particularly with the treatment of skinned beef carcasses to improve the appearance of the skinned surface and especially the fat.

In the handling of beef carcasses it is customary to skin the carcasses on the killing floor, divide the skinned carcass into sides and transfer the sides to a regular cooler in which a temperature of about 30° F. to 35° F. is maintained. In the cooler the carcass gradually chills with the elimination of animal heat and reaches the temperature of approximately that of the cooler in a period of about 72 hours. Thereafter the carcass may be held in the cooler for the regular aging period, which may be around two to three weeks, before the meat is marketed.

It has been found in the treatment of beef by the regular method substantially as described above that the surface of the meat is objectionable as to color, texture, and moisture content. For example, the color of the meat, particularly the fat, tends to have a fiery or blood-stained condition. Also, the surface fat of the carcass shows a chalky, crumbly, flaky texture. Moreover, no attempt is made to control the humidity in the ordinary cooler and as a consequence there is considerable dehydration of the surface of the fat, resulting in a dry mottled appearance of the surface of the fat.

The above difficulties are peculiar to beef carcasses. Veal carcasses are often chilled with the hide on, and furthermore, the veal carcasses do not contain heavy surface fat, but instead a thin membraneous tissue called the "fell." As a consequence, there is no characteristic alteration in the fat surface of the veal such as encountered with beef carcasses. While lamb or sheep carcasses may have a considerable layer of fat on the surface, such fat contains a substantial amount of oil content which retards alterations in the surface of the fat such as dehydration and discoloration.

In the skinning of beef carcasses the skin is separated from the surface of the fat layer causing rupture of tiny blood vessels and the exposure of the surface of the fat containing such blood vessels to the atmosphere. The exposure of the freshly skinned carcass to the atmosphere of the cooler causes a substantial amount of the blood to remain on or near the surface of the fat as the fat congeals. Also, the contact of the freshly skinned carcass to the atmosphere causes more or less shell cooling which may trap or force blood to or near the surface of the fat,

2 giving the fat a fiery appearance. It is desirable to obtain a white colored adipose tissue on the external surface of the beef carcass wherein the venules and capillaries are comparatively free of residual blood. Heretofore the chilled carcass often contained fat having clotted blood which is thought to be oxyhemoglobin.

I have found that the surface fat of beef carcasses may be greatly improved if the warm freshly skinned carcass is subjected to controlled cooling under regulated conditions of humidity, temperature and time. The humidity during the cooling period is maintained at approximately the saturation point for the atmosphere surrounding the carcass during the cooling period regardless of the temperature. This condition of humidity is maintained while the carcass is cooled to a temperature at which the fat assumes a plastic consistency, for example, about 50° F. to 70° F. The time required to arrive at such temperature will vary depending on the temperature of the cooler and whether the surface of the carcass is protected with a covering material. In the ordinary cooler the temperature is maintained at around 33° F. to 35° F. The time for the surface of the bare carcass to reach the aforesaid temperature of 50° F. to 70° F. is approximately four to eight hours for the rib or loin and may be up to eighteen hours for the round. In coolers wherein a forced circulation of cooled air is maintained the time may be quicker, for example, four hours or less.

As the temperature is lowered, the surface fat on the carcass tends to assume a plastic consistency containing considerable moisture and residual blood. Under these conditions the fat may be compressed or packed to squeeze the moisture and blood to the surface. The material squeezed out of the fat may then be removed from the surface of the fat to produce a surface substantially free from the fiery condition. I prefer to squeeze out the blood and moisture from the fat after the treatment described above with a roller of the nature of a squeegee. The moisture squeezed out of the fat may run off the carcass or be removed by wiping with a cloth or other suitable absorbent material. The carcass at this stage may be further cooled to a normal cooler temperature to around 30° F. to 35° F. and during the latter cooling period it is unnecessary to maintain a high humidity or to regulate the humidity.

The aforesaid high humidity in the atmosphere during the initial stages of cooling may be obtained in any suitable manner although I have found two ways satisfactory. One method is to control the humidity of the entire atmosphere in the cooler. This may be done by injection of water vapor such as a water spray or steam injection. The humidity around the carcass may also be raised to substantially the saturation point by covering the carcass with a material substantially impervious to moisture and air. Such materials may be wax paper, moisture-proof canvas bag, or one or more layers of paper and cloth in combination. The covering material produces a dead air space around the carcass which remains at substantially a saturation point as a result of evaporation of moisture from the surface of the carcass into the dead air space. I prefer to first clothe the freshly skinned carcass on the killing floor with a cloth which may advantageously be moistened with brine. Such cloth may be maintained on the carcass during the initial chilling step, i. e., the chilling of the carcass under high humidity to a temperature of 50° F. to 70° F. The cloth tends to bleach the fat and retard discoloration. The cloth also serves as a means for blotting or absorbing the blood and moisture as it is squeezed from the fat by the roller. The cloth with the absorbed moisture and blood is preferably removed and replaced with a fresh cloth which is maintained on the carcass during the final cooling step. It may be desirable to clothe the carcass on the killing floor with a double cloth and then after rolling the partially cooled carcass to remove only the outer cloth which has absorbed the major portion of the blood. The inner cloth may be retained on the carcass during the final cooling step and cooler storage. In case the carcass is clothed on the killing floor with a single or double cloth as aforesaid, the cloths are maintained on the carcass during the initial cooling step and during the high humidity with or without the paper bag as the case may be.

The following data show the results of an actual test on a side of beef held in a cooler at 26° F. to 29° F. The temperatures were measured at one inch below the surface on the rib and the round. The data is for a clothed carcass. The results would not be greatly different for a bare carcass, although the bare carcass would cool down at a slightly faster rate.

| Hours in Cooler | Round | Rib |
|---|---|---|
|  | ° F. | ° F. |
| 2 | 84 | 83 |
| 2½ | 81 | 77 |
| 3½ | 78 | 70 |
| 4 | 77 | 67 |
| 4½ | 75.5 | 64.5 |
| 5 | 74 | 62 |
| 5½ | 73 | 60 |
| 6½ | 70 | 56 |
| 8½ | 66 | 49 |
| 10½ | 62 | 44 |
| 12½ | 58 | 40 |
| 14½ | 56 | 37 |
| 16½ | 53 | 35 |
| 18½ | 50 | 32 |
| 20½ | 49 | 31 |
| 24 | 46 | 30.5 |

It will be observed from the above data that the surface reaches the temperature within the range of 50° F. to 70° F. within a period of about 3 to 8 hours for the rib and within a period of about 6 to 18 hours for the round. The longer time for the round is due to the greater mass and thickness of the meat.

As an example of the operation of the invention, a side of beef was clothed on the killing floor with two brine soaked cloths. The carcass was then transferred to a cooling chamber maintained at a temperature of about 33° F. to 35° F. The humidity in the cooling chamber was maintained in excess of 85 per cent by the injection of water vapor. The carcass was held in the cooler for approximately 6 hours. The surface temperature on the loin at the end of this period was approximately 56° F. and the temperature on the surface of the round was about 70° F. The surface of the carcass was then rolled with a rubber roller to squeeze the blood out of the fat and to smooth the fat. The surface blood squeezed out of the fat, passing through the inner cloth, and showed up as stains on the outer cloth. The outer cloth with the blood stains was then removed from the carcass, leaving the inner cloth which was substantially clean on the carcass. The once clothed carcass was then transferred to another cooler maintained at about 30° F. to 35° F., and a humidity of about 85 per cent which is normal for regular beef coolers, in which there is no attempt made to control the humidity. The carcass was allowed to remain in the latter cooler until it attained the temperature of the cooler. It was found that the carcass treated as described above showed a uniform white fat surface, substantially free from any blood stains or fiery appearance.

Another side of beef was double clothed in the same manner and placed in a regular cooler having a humidity of around 85 per cent. The carcass was allowed to remain in the cooler until it had attained the temperature of the cooler and without any rolling of the fat to squeeze out the blood. It was found upon removing of the cloths that the fat surface had a fiery appearance due to streaks of blood remaining in the fat.

By the term "beef carcass" as used in the foregoing specification, I mean either one or both sides of the animal, or the fore and hindquarters of one or both sides, or the trimmed fore and trimmed hindquarters of one or both sides, said trimmed hindquarter consisting of a round and full trimmed loin and said trimmed forequarter consisting of a rib and chuck.

Obviously, many modifications and variations of the invention hereinbefore set forth may be made without departing from the spirit and scope thereof, and therefore, only such limitations should be imposed as are indicated in the appended claims.

I claim:

1. The method of treating beef carcasses to improve the surface of the meat which comprises cooling the warm freshly skinned carcass to a temperature of about 50° to 70° F. until the surface fat assumes a plastic consistency, said fat containing particles of blood occluded therein, and then applying sufficient pressure to the surface of said plastic fat to press the blood therefrom, whereby the color and texture of the surface of the carcass are improved.

2. The method of treating beef carcasses to improve the surface thereof which comprises, subjecting the freshly skinned carcass before dissipation of the animal heat to temperatures of about 50° F. to 70° F. until the fat assumes a plastic consistency, said fat containing particles of occluded blood, then before the fat has hardened applying mechanical pressure to the fat to squeeze the blood to the surface of the fat and removing the blood from the surface of the carcass.

3. The method of treating beef carcasses to improve the surface thereof which comprises cooling the warm freshly skinned carcass in an atmosphere of relatively high humidity to a temperature sufficiently low to cause the fat to become plastic, said fat containing particles of occluded blood, and then before the fat has hardened rolling the fat to squeeze the blood therefrom.

4. The method of treating beef carcasses to improve the surface thereof which comprises applying a cloth to the warm freshly skinned carcass, cooling the clothed carcass to temperatures of about 50° F. to 70° F. to cause the fat containing occluded blood to become plastic, and then mechanically squeezing the blood to the surface of the fat while in said plastic condition whereby the blood is absorbed by the cloth.

BEVERLY E. WILLIAMS.

REFERENCES CITED

The following references are of record in the file of this patent:

UNITED STATES PATENTS

| Number | Name | Date |
|---|---|---|
| 1,506,599 | Murphy | Aug. 26, 1924 |
| 2,076,053 | Williams et al. | Apr. 6, 1937 |
| 2,117,125 | Williams et al. | May 10, 1938 |
| 2,259,868 | Williams et al. | Oct. 21, 1941 |
| 2,278,039 | Williams et al. | Mar. 31, 1942 |
| 2,339,507 | Nagy et al. | Jan. 18, 1944 |